Nov. 29, 1966 R. L. ABOS 3,288,573
HIGH TEMPERATURE RESISTANT MEMBER AND PROCESS FOR FORMING
Filed Oct. 3, 1960 3 Sheets-Sheet 1

INVENTOR.
Ralph L. Abos
BY Manfred M. Warren
His Attorney

Nov. 29, 1966    R. L. ABOS    3,288,573
HIGH TEMPERATURE RESISTANT MEMBER AND PROCESS FOR FORMING
Filed Oct. 3, 1960    3 Sheets-Sheet 2
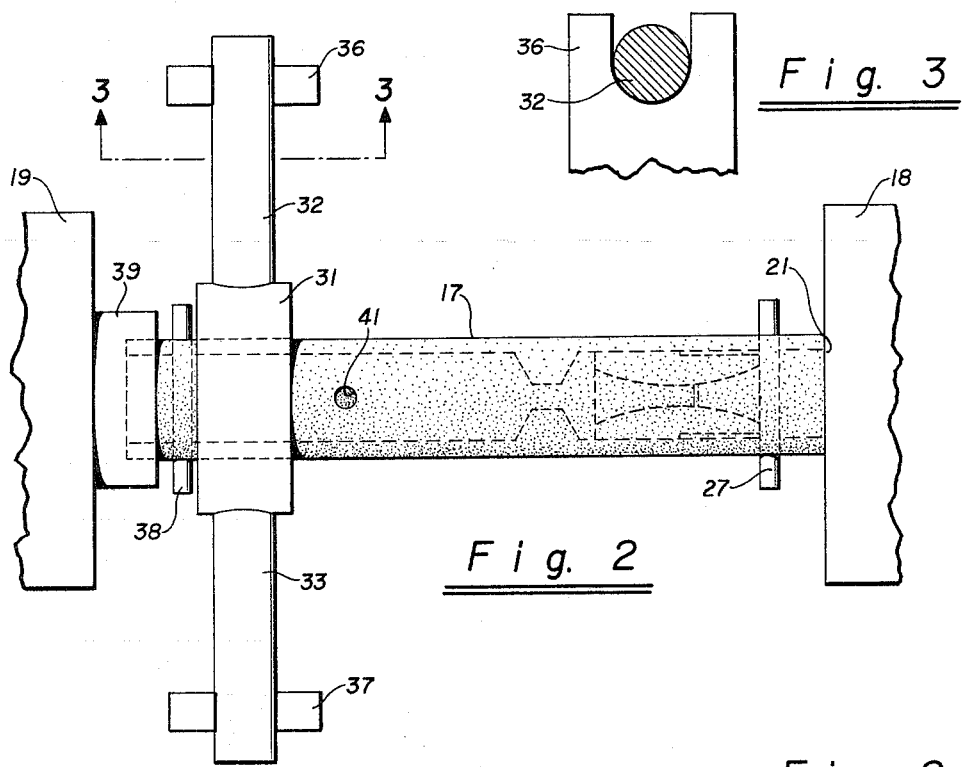
Fig. 2
Fig. 3
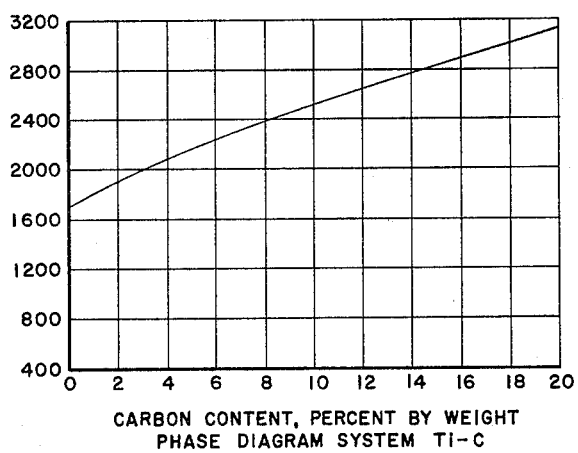
Fig. 5
CARBON CONTENT, PERCENT BY WEIGHT
PHASE DIAGRAM SYSTEM TI-C
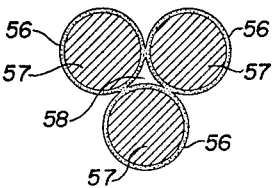
Fig. 9
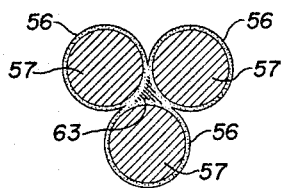
Fig. 10
INVENTOR.
Ralph L. Abos
BY Manfred M. Harren
His Attorney INVENTOR.
Ralph L. Abos
BY
His Attorney

United States Patent Office 3,288,573
Patented Nov. 29, 1966

3,288,573
HIGH TEMPERATURE RESISTANT MEMBER AND
PROCESS FOR FORMING
Ralph L. Abos, Whittier, Calif., assignor to Polycarbide
Corporation, a corporation of California
Filed Oct. 3, 1960, Ser. No. 59,893
9 Claims. (Cl. 29—182.8)

The invention relates to compositions having utility in high temperature structural applications, for example, rocket nozzles, and to processes and apparatus by means of which such parts can be produced.

One of the highest known melting point materials is graphite. However, graphite has low physical properties in compression and tensile strength, is quite soft and incapable of withstanding abrasion. Accordingly, graphite rocket nozzles have not been capable of withstanding required compression pressures or the abrasion of the exhaust gases for more than a very short duration—in the order of a second or a fraction of a second. One approach has been to design the rocket charge to compensate for a growth or erosion or enlargement of the nozzle orifice and in this way to obtain some effective added life to the nozzle part. However, this approach sacrifices efficiency and there is in any event a need for a nozzle which will last very much longer than the graphite nozzle even with the compensated charge design.

Solid propellant fuels make use of materials such as aluminum which on oxidizing become very abrasive. The combination of high chamber pressures and abrasive gases rapidly erodes anything other than the hardest abrasion resistive materials. Erosion is accelerated by reason of high pressures and also by reason of the very high velocity gaseous flow which accompanies high pressure. One approach attempted to resist this abrasion has been to flame spray carbide materials such as tungsten carbide, titanium carbide, tantalum carbide, etc. onto the graphite surface to provide a thin carbide coating in the order of a few thousandths of an inch. Quality control has been a problem with this technique and a general inability to consistently reproduce nozzles of uniform high quality and predictability. One problem has been to determine whether the coating has formed a proper bond with the graphite or will easily or rapidly spall off in use. Also, carbides have poor thermal shock qualities and must, therefore, be applied in thin coatings. By thermal shock is means the ability of the material to withstand high temperatures applied to a point or small localized portion of the part without fracturing. While carbides themselves have high compression strength, they are so very friable and brittle as to make it virtually impossible to realize any substantial compression strength from the coating of carbide on the underlying, relatively spongy graphite material. Under load, the underlying material will yield permitting the coating to flex which results in immediate cracking, spalling and breaking up of the surface coating.

Attempts to electroplate metal onto the surface of graphite nozzles has not, insofar as presently known, produced any really usable or useful product. Some success has been had in a siliconized coating on graphite. Such a coating may be produced by fusing silicon on the surface of the graphite to produce a thin silicon carbide coating. Since this is a thin coating it is subject to the disadvantages above noted and nozzles so fashioned may be used only at relatively low pressures and temperatures.

Another approach has been to use a solid metal such as tantalum for the rocket body and to carburize or case harden the exposed surface by the provision of a thin carbide surface coating on the nozzle body. These coatings have poor thermal shock qualities and will spall off rapidly in use exposing the base metal for disintegration.

Ceramics have generally failed due to the reducing atmosphere present in solid propellant fuels upon combustion. Ceramics such as aluminum oxide, etc. reduce to the base metal and disintegrate.

It is possible to produce homogeneous carbide bodies from tungsten carbide, tantalum carbide, titanium carbide, etc. These materials may be melted at very high temperatures and poured into a mold to produce a solid carbide nozzle body. Such a body has high temperature characteristics and good abrasion resistance, but has very low thermal shock qualities and fractures and disintegrates rapidly in the rigorous use here considered.

Maximum conditions so far obtained in a design of materials for rocket nozzles has been for temperatures of up to about 5000° F., chamber pressures of up to about 2000 lbs. per square inch and a duration or life of up to about six seconds. The present need is for a much improved material, one which will withstand temperatures up to about 12,000° F., chamber pressures of up to approximately 5000 lbs. per square inch and a duration or a life of, say, 60 seconds.

The composition of the present invention combines the desirable high temperature thermal shock resistant qualities of graphite with the high strength and abrasive resistant qualities of carbide and, in addition, gains certain other advantages hereinafter noted. The product is thus specifically designed for use in high temperature and high pressure applications where abrasion resistant qualities with good dimensional stability, anistropy, and thermal shock resistance. At high operating temperature, the material of the present invention has ductility and resistance to thermal fatigue, resistance to oxidation, superior impact strength, stress-rupture strength, tension and compression strength as well as an adequate compression modulus. In addition, the material has the ability to take a smooth surface as by grinding or other mechanical finishing and to maintain its smooth surface. Ablation propagation is good. The material has a high coefficient of thermal transfer and a low coefficient of thermal expansion for dimensional stability.

Another feature of the present product is its ability to "regenerate," that is, to withstand increasingly higher temperatures up to the ultimate disintegration point of the material.

Another object of the present invention is to provide processes and apparatus by means of which the product of the present invention may be accurately reproduced in production with reliability, the product thus having a reproducibility qualifying it as an engineering material.

The invention possesses other objects and features of advantage, some of which, with the foregoing, will be set forth in the following description of the preferred forms of the invention which are illustrated in the drawings accompanying and forming part of this specification. It is to be understood, however, that variations in the showings made by the said drawings and description may be adopted within the scope of the invention as set forth in the claims.

Referring to said drawings:

FIGURE 2 is a plan view of the apparatus illustrated in FIGURE 1.

FIGURE 3 is a fragmentary cross-sectional view of a part of the apparatus as taken substantially on the plane of line 3—3 of FIGURE 2.

FIGURE 5 is a phase diagram of the titanium carbide system illustrating one of the properties of the present product.

FIGURE 9 is a diagrammatic cross-sectional view on an enlarged scale of another product formed by the present invention.

FIGURE 10 is a cross-sectional view similar to FIGURE 9 and showing another product formed sequentially to the product illustrated in FIGURE 9.

Figure 4:
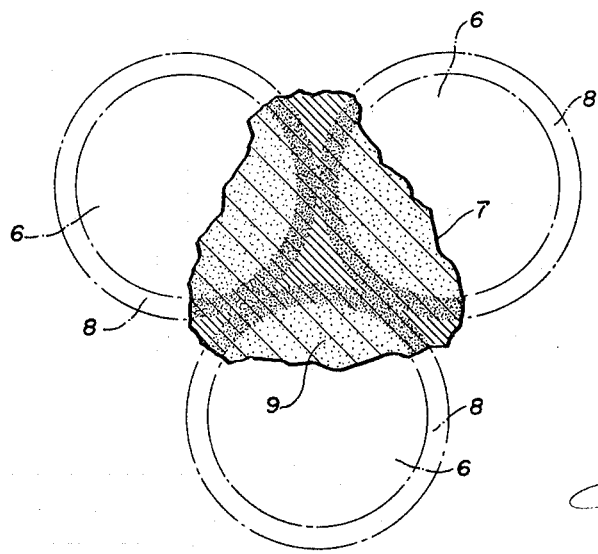
FIGURE 4 is a greatly enlarged and diagrammatic view depicting the composition of the present invention.

The composition of the present invention and as generally depicted in FIGURE 4 consists of discrete graphite particles 6 which are embedded in a surrounding metallic network or matrix 7 which surrounds and binds the particles 6 into a solid mass, the matrix 7 being formed of a carbon combining metal which will form a solid solution or alloy bond with the graphite 6. The product is further characterized as illustrated in FIGURE 4 by a transition or alloy zone 8 which surrounds each of the graphite particles and which changes in its composition throughout the full range of from pure graphite at the particles 6 to pure metal at the interstices 9 between the particles. This transition or alloy zone 8 thus provides an integrating matrix for the products and is obtained by using a metal which is either carbide forming or which will alloy with carbon to form a solid solution bond. Such materials include titanium, zirconium, hafnium, vanadium, niobium, tantalum, chromium, molybdenum, tungsten, silicon, and others.

The resulting product is metal reinforced graphite so as to take the initial shock which pure carbide or graphite is wholly incapable of doing. The carbide or alloy material vastly improves the abrasion resistance of the pure graphite. On the other hand, the graphite particles serve as a much needed heat sump and give the product thermal shock resistance qualities which the carbide material lacks.

As hereinabove noted one of the features of the present product is its ability to "regenerate" in withstanding increasingly higher temperatures. This is accomplished in the present invention by stabilizing the metallic network 8 and 9 at a point where the combined carbon is relatively low for the particular metal used, and by selecting a metal which exhibits increased temperature resistance characteristics as it takes on increased amounts of carbon. Thus, as the product is subjected to increased temperature, the metal reacts with the graphite to pick up more carbon, and in so doing increases its melting point or melting temperature. Also, this process absorbs energy so as to aid in the ability of the product to withstand the impressed heat. Metals which fall within the class which will produce a regenerative product are titanium, zirconium, hafnium, vanadium, tantalum chromium, silicon, niobium, thorium, and uranium.

A temperature carbon content curve is illustrated in FIGURE 5 for titanium carbide which shows the wide homogeneity range from zero to 20 percent carbon content, percent by weight, with an increasing melting point from about 1725° C. to about 3100° C. over the carbon range noted. This figure is taken from page 83 of the text, Refractory Hard Metals, authored by Schwarzkopf and Kieffer, and published by MacMillan Company, 1953.

The similar temperature curve for tantalum is illustrated at page 118 of the aforementioned text wherein the temperature range extends from approximately 2800° C. at about ½ of 1 percent carbon to about 3800° C. at about 6.2 percent carbon. The hafnium-carbon temperature curve rises rapidly from about 2230° C. at about 3½ percent carbon to about 3900° C. at about 6.5 percent carbon. The curve for zirconium carbide is again similar wherein the temperature range runs from about 1860° C. to about 3500° C. from about 3 percent to about 12 percent. The characteristic temperature curve for niobium carbide extends from about 1950° C. to about 3500° C. over a carbon range of about 3 to 12 percent. The characteristic vanadium carbon curve has a temperature range of about 1715° C. to about 2830° C. over a carbon range of about 1 to 19 percent. The silicon, thorium, chromium and uranium carbide systems follow a similar upward temperature curve with increased percentage of carbon.

One of the processes of the present invention as more fully hereinafter developed makes an important use of this increase in melting temperature with increased carbon. In this process the molten carbon combining metal is caused to flow into the porous graphite structure and as the metal flows into the interstices of the graphite body the metal forms an immediate high temperature film or envelope around the carbon particles. This envelope or film is rich in carbon and accordingly has a relatively high melting point—much higher than the liquid metal itself. Consequently, the envelope forms a path for the liquid metal to flow into and through the whole porous structure. As the metal is thus entering and filling the porous structure, alloying of the metal and carbon takes place, producing the transition zone above described.

Figure 1:
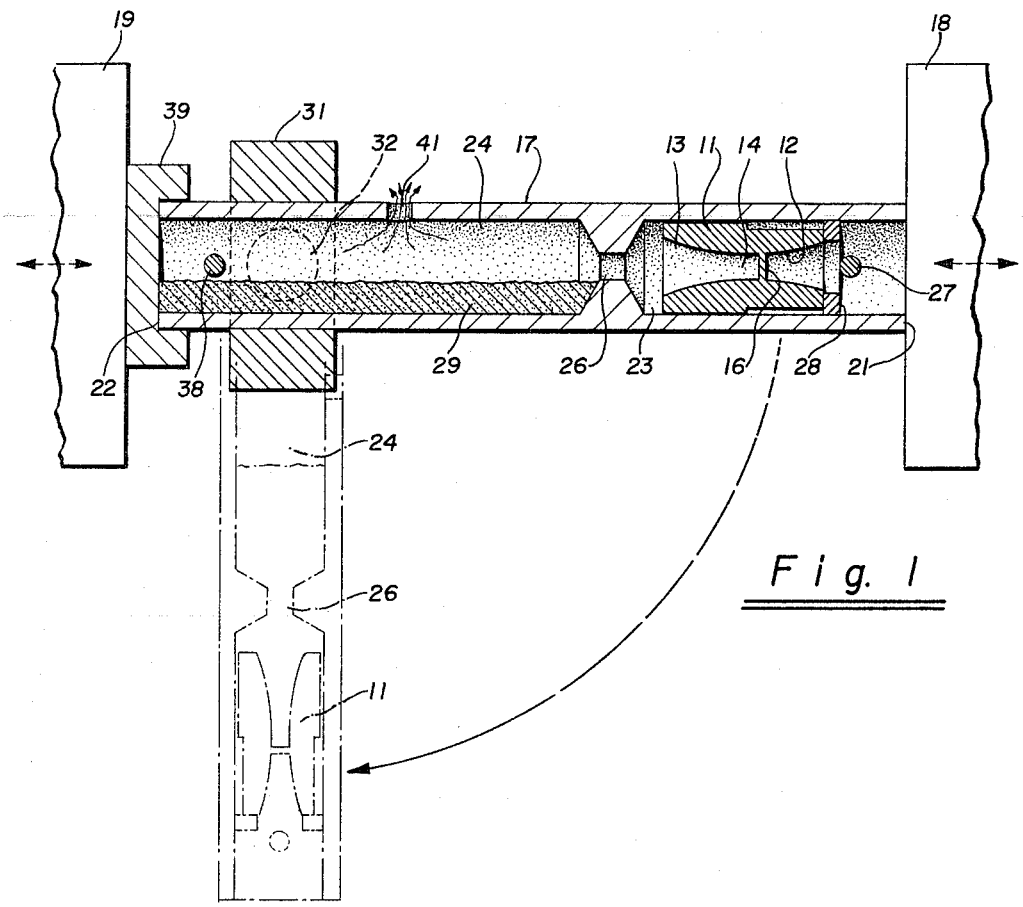
FIGURE 1 is a cross-sectional view of an apparatus embodying the present invention.

The apparatus and process of the present invention as illustrated in FIGURES 1, 2 and 3 of the accompanying drawing has the ability to accurately control and predetermine the end product repetitively in technical or relatively large scale production; and has as other features relative simplicity, low cost and adaptable to automatic operation with a minimum of skill. The end product is case hardened completely through the structure with substantial uniformity and requires a minimum of further machining or processing which is very important in the case of very hard materials.

In this form of the invention the part 11 is pre-formed from graphite as by molding or machining the part from porous graphite. This material is commercially available from National Carbon, Atcheson, Union Carbide & Carbon, and others. The part 11 is here illustrated as a rocket nozzle having an entrance passage 12 and a discharge passage 13 forming a venturi passage which necks down to a restricted orifice 14. Importantly, however, the part 11 is formed with an internal temporary web 16 which restricts the free flow of metal through the body 11 and passages 12 and 13 in the ensuing impregnating process.

The graphite body 11 is mounted within a tubular graphite crucible 17 which is in turn mounted or chucked between electrodes 18 and 19 which bear against the ends 21 and 22 of the crucible to support the latter rigidly, and preferably in the present embodiment in a substantially horizontal position, and with a firm clamping force so as to provide not only a mechanical support for the crucible but also electrical contact pressure for feeding electric current through the crucible for heating of the contents. Preferably, the electrodes 18 and 19 are formed of graphite and are fed with an appropriate electric current as, for example, alternating current voltage of about 5 to 33 volts capable of feeding approximately 100 to 1,000 kva. or more power into the crucible. The crucible 17 is here formed with connected internal chambers 23 and 24 which are connected by a restricted metal dump orifice 26. The specimen part 11 is mounted in chamber 23 between orifice 26 and a retaining pin 27 mounted crosswise through the tubular crucible 17. Preferably, a retaining support ring 28 is mounted between one end of body 11 and cross pin 27 so as to provide a full circle support for the lower end of the body during the casting or impregnating process to follow. A pre-determined charge of metal 29 is positioned in chamber 24. Any of the carbon combining or alloying metals above described may be used either singly or in combination. These metals may be deposited in chamber 24 in either powdered, or granular, or pellet, or ingot form.

In accordance with the present invention, the crucible 17 is initially supported between the electrodes 18 and 19 with the chambers 24 and 23 substantially horizontally aligned, and the crucible is maintained in this position for heating of the body 11 and melting of the metal 29. The mounting means is here arranged to subsequently disengage the crucible from the electrodes and cause a reorienting of the crucible positioning the metal chamber 24 above the specimen chamber 23, as illustrated in phantom line in FIGURE 1 so as to cause the flow of molten metal from chamber 24 through the metal dump orifice 26 upon and over the body 11.

The tubular crucible 17 is here carried by a cross-yoke structure providing an eccentric (relative to the length of the crucible) pivotal support so that when the crucible is released by backing off or separating the electrodes 18 and 19, the crucible will automatically drop at its right hand end, as viewed in FIGURE 1, with automatic pendulent swinging action to a vertical position depending from the yoke and as illustrated in phantom line in FIGURE 1. The yoke structure here includes a yoke collar 31 surrounding the crucible 17 and which is connected to diametrically arranged shafts 32 and 33 which are carried at their outer ends in yoke swivel nests 36 and 37.

With reference to FIGURE 5, it will be seen that the yoke assembly is positioned adjacent the left-hand end of the tube so as to cause the descending movement of the right hand end 21 of the tube when released by the electrodes 18 and 19. A retaining pin 38 is mounted crosswise through crucible 17 to support the latter on the top of the yoke collar 31 when the assembly is rotated to a vertical position. Preferably, an end cap 39 is used between end 22 of the crucible and electrode 19 so as to close the metal compartment 24 and prevent the molten metal from contacting the graphite electrode 19. The retaining pins 27 and 28, the supporting yoke collar 31, shafts 32 and 33, and supporting ring 28 are desirably formed of graphite. The yoke swivel nest 36 and 37 may be formed of an asbestos base material such as Transite.

When the parts are assembled as illustrated in FIGURES 1 and 2, current is fed through the crucible heating it to an incandescent white heat over a range of about 3000° F. to 6000° F. depending upon the metal used and end product desired. In accordance with the present invention and as an important feature thereof, a control point has been determined for the accurate reproduction of the parts. This control point involves a flash type gasification which seems always to occur as the molten metal is brought up to near the preferred temperature for combination with the graphite part. At the control point, the molten metal will gasify, sending a tell-tale jet of visible gas through a vent opening 41 provided in the crucible for this purpose and communicating with the metal compartment 24. This gas jet will continue for a period of a few seconds and has a rather sharp cutoff which can be used as a control point. Preferably, at this point the operation of the apparatus is turned over to an automatic timer which controls the further heating period. This additional heating period may be determined by experiment and may run from about three or four seconds to about 25 or 30 seconds following which the electrodes 18 and 19 are withdrawn to release the crucible for movement into its vertical position causing the molten metal to flow through the dump orifice 26 onto the body 11.

Preferably, a pre-determined clearance is maintained around the body 11, that is, between the body 11 and the internal wall of the crucible in the order of a 64th of an inch or so for confining the flow of molten metal over the outside periphery of the body. The molten metal will pour down through orifice 26 and into the upper end of body 11 filling and over-flowing chamber 13 and causing the molten metal to flow around the outside of the body in the narrow pre-determined clearance provided.

It has been found that the attraction of the metal by the graphite body under the conditions herein described that the metal is very rapidly absorbed into the porous body in a matter of a second or so. By pre-determining the amount of metal 29 to the amount which will be so absorbed by the body 11, very little metal will pass the lower end of the body. The metal flows completely out of cavity 13 and into the body so that no metal will normally appear on the surface of body 11.

The proportions of materials used will depend in a substantial measure on the porosity of the graphite body, the specific gravities of the metal or metals used, and the percentage of metal which will combine or form an amalgam or solution with the graphite. The ideal porosity of the graphite body, assuming particles of spherical shape, is approximately 48 percent, and experience has indicated that this percentage affords a starting point in the computation of proportions. It can be in each instance computed as to the amount of metal required to fill the voids of the graphite body and it has been found from experience that this amount of metal should be increased by 25 to 30 percent to provide for the quantity of metal which goes into the amalgam or solid solution bond. Accordingly, the amount of required metal to fill the speciment part may be determined by computation and experimentation so that a homogeneous product results without undesirable accumulation of metal on the surface of the product.

The simultaneous heating of the graphite body to the molten point of the metal seems to be an important step in preparing the graphite body for the immediate absorption of the molten metal. The hot graphite body is "thirsty" so to speak for the metal and acts like a sponge in sucking in the molten metal when the latter is brought into surface contact with the hot graphite body. Also, the maintaining of the hot graphite body retains the metal in molten, flowable form so that complete penetration or flow of the metal into the graphite body results, filling all of the interstices. The highly heated graphite and metal also produces the atomic diffusion between the two materials or the solid solution bond as above explained. The metallic material may be introduced into the process either as a pure metal or as an oxide or salt or other combined form. Upon elevating the temperature under a reducing atmosphere to the molten point of the metal, any of these forms would decompose and reduce affording pure molten metal for impregnating the graphite body as above noted. Where the metal and graphite body are separately heated as in this application, the metal may be purified by driving off of impurities, etc. prior to its contact with the graphite. In other words, the metal can be brought up to an ideal temperature for combination and penetration prior to the bringing together of the two parts, viz., the metal and the graphite.

Figure 6:
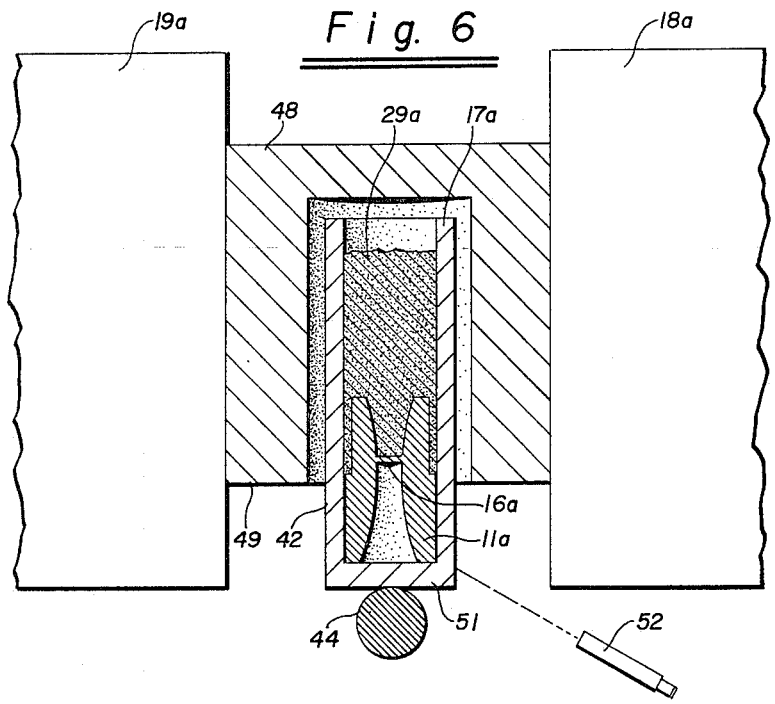
FIGURE 6 is a cross-sectional view of another form of apparatus.

Another process of producing a similar type of high temperature resistant produce is illustrated in FIGURE 6 and consists of impregnating a porous graphite body 11a of the type above described with a molten carbon-combining metal by simultaneously heating the body 11a under a head of the metal and continuing to heat to the molten point of the metal to thereby cause the flow of molten metal over and into the body. This process may be controlled by pre-determining the amount of metal 29a or it may be controlled visibly by supporting the body and metal in a crucible 17a having a viewable sidewall 42 co-extensive with the base of the part 11a. In this arrangement the heating of the molten metal will cause the latter to flow not only into the part 11a but also between the exposed wall 42 and part 11a which may be readily observed. When the molten metal penetrates between wall 42 and part 11a to a position opposite the base of part 11a, the parts can be dropped out of the heating unit, as by the removal of a pin 44, and into a water quench or the like to stop the process. In the apparatus illustrated in FIGURE 6, the crucible 17a is supported on the dump pin 44 within a hollow cavity 46 formed in a graphite block 48 which forms a resistance element which is chucked between a pair of electrodes 18a and 18b. As will be seen from FIGURE 6, the lower end portion 42 of the crucible is exposed for viewing below the bottom 49 of the block 48. Crucible 17a is here formed with a closed bottom wall 51 for supporting the specimen part 11a and the carbon combining metal 29a is mounted in the hollow interior of the crucible above the body 11a. This metal may be in powdered or granular or pellet form as above explained.

Upon energizing of the resistive block 48, crucible 17a is rapidly brought up to temperature raising the metal 29a to its molten point when it begins to flow into the porous body 11a. The metal will simultaneously flow between the wall of the crucible and body 11a this inflow of metal in between the crucible wall and body 11a may be readily observed, with or without the use of an appropriate viewing device 52. When the inflow of hot metal has penetrated to the bottom of the crucible, the dump pin 44 is removed and the crucible 42 is dropped into a water bath and quenched as above noted. A center web 16a in the part 11a functions in the same manner as in the above described embodiment to retain the liquid metal in the upper chamber of the part for flowing out uniformly into the walls of the body 11a.

The product of the present invention, that is, a body composed of discrete graphite particles surrounded by a carbide or metal alloy matrix or envelope can be formed by admixing powdered graphite and powdered metal and compacting into a form such as the nozzle part and then heating to the molten point of the metal so as to cause the flow of the metal around and the bonding of the metal with the individual graphite particles. Normally, however, this process will produce a porous part which may have utility or which may be filled with a metal which preferably bonds with the carbide or carbon alloy matrix.

Figure 7:
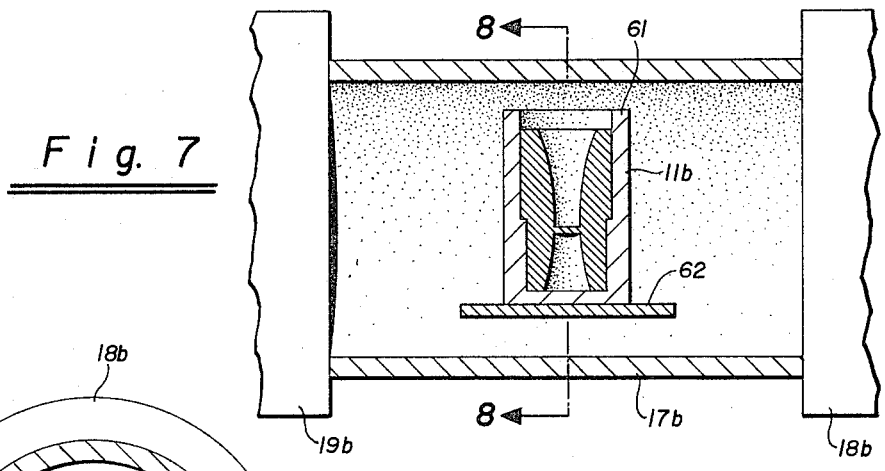
FIGURE 7 is a cross-sectional view of still another form of apparatus.
Figure 8:
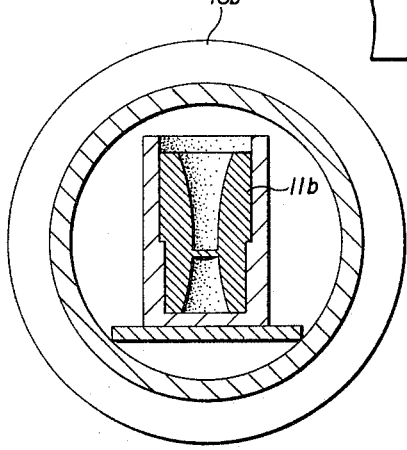
FIGURE 8 is a cross-sectional view of the apparatus illustrated in FIGURE 7 and is taken substantially on the plane of line 8—8 of FIGURE 7.

For example, the graphite body 11b as illustrated in FIGURES 7 and 8 may be formed by compacting granular graphite and granular metal with a temporary binder into the final form as illustrated, such as the nozzle body. A binder such as glucose may be used for this purpose. The part thus formed is preferably baked at approximately 450° F. so as to carbonize the binder and provide a fairly rigid body for easy manual handling. The body 11b may then be mounted in a tubular graphite crucible 17b chucked between electrodes 18b and 19b and the part brought up to fusing temperature for reaction of the metal and graphite to form a high temperature resistant coating around the particles, such as the coating or envelope 56 around discrete graphite particles 57 as illustrated in FIGURE 9. As will be seen from FIGURE 9, the surface carbide coating 56 leaves voids 58 between the coated particles and which may provide a passage for the ensuing inflow of metal. Preferably, part 11b is supported in a tubular graphite boat or receptacle 61 so as to properly support the part within the crucible 17b for fusing. One or more such graphite boats may be mounted within the interior of the crucible 17b, as upon a graphite strip 62.

When the part 11b has been fused as above explained, the balance of the carbide-combining metal may be run into the voids 58 by mounting the piece 11b in either the apparatus illustrated in FIGURE 1 or the apparatus illustrated in FIGURE 6 and pouring the molten metal onto the part as described in connection with those two embodiments.

This process is well adapted for use with highly reactant metals since only a small pre-determined amount of metal need be initially bonded in the fusing process. The subsequent running in of the metal may be done at a lower temperature so that the metal will penetrate fully and completely through the graphite body; and the extent and thickness of the carbide coating or solid solution bond can be controlled by the temperature at which the part is maintained in the second phase of the process. Also, this process permits the use of different metals, one for the initial carbide coating 56 and the other for filling the interstices 58. Also, metals which are not carbon-combining may be used as the second metal. For example, the part may first be sintered with silicon to form a silicon carbon bond in the envelope 56. The second metal may then be aluminum which fills the interstices as illustrated at 63 in FIGURE 10, it being noted that the aluminum would not combine with the carbon but will combine with the silicon-carbon envelope 56. The use of aluminum 63 in the body of the part adds greatly to the tensile strength of the part; and where desired, the exposed surface of the aluminum may be anodized to provide a hard surface for wear and corrosion resistance. In this combination, the graphite 57 provides the needed heat sump and the aluminum provides tensile strength and ductility. Such a material may have high temperature applications such as for atmosphere reentry vehicles in the missile field where temperatures would be in the order of 2500° F. to 3000° F. In such case the part, such as a nose cone, leading edges on aircraft, need have good tensile strength and ductility. The aluminum has high thermal conductivity for rapidly transferring the heat into the graphite heat sump and accordingly the temperature of the aluminum phase may be kept to a safe limit. Other suggested uses of the material of the present invention is for pump or turbine impellers or for filter required to work with or handle high temperature fluids including molten metals or chemicals. While the particular silicon aluminum combination above described has certain specific advantages for specific applications it will be understood that the carbide envelope 56 may be formed from any of the carbide combining metals above discussed and the core metal 63 may be any of these metals or aluminum or other metal or metals.

I claim:
1. A high temperature resistant member comprising, discrete graphite particles, a high temperature melting carbon combining metal of the group consisting of titanium, zirconium, hafnium, vanadium, niobium, tantalum, chromium, molybdenum, tungsten and silicon forming carbide envelopes around said particles and voids between said envelopes, and a metal having a melting point lower than said envelope alloy in said voids and bonded to said envelopes.

2. A high temperature resistant member comprising, discrete graphite particles, silicon envelopes around said particles and bonded thereto and defining voids between said envelopes, and aluminum in said voids and bonded to said envelopes.

3. A process of producing a high temperature resistant product which consists of supporting a porous graphite body and a superimposed mass of carbide forming metal in a porous graphite crucible, supporting and heating said crucible with a viewable side wall co-extensive with the base of said body, continuing said heating to the molten point of said metal to thereby cause the flow of molten metal over and into said body and said crucible, maintaining said heat until the observable flow of metal extends to the base of said body, then quenching said body.

4. The process of forming a high temperature resistant product which consists in first forming silicon carbon alloy envelopes around discrete graphite particles and defining voids between said envelopes and then filling said voids with aluminum bonded to said envelopes.

5. The process of forming a high temperature resistant product which consists in admixing graphite particles and silicon, heating the admixture to an elevated temperature causing the melting of said silicon and flow thereof around said particles to produce silicon carbon alloy envelopes around said particles and voids between said envelopes, and then flowing molten aluminum into said voids at a temperature below the melting point of said envelope alloy.

6. A high temperature resistant member comprising; a body composed of discrete graphite particles; a metal matrix surrounding and binding said particles into a solid mass, said matrix being formed of free uncombined metal selected from the group consisting of hard high temperature melting and carbon combining metals including titanium, zirconium, hafnium, vanadium, niobium, tantalum, chromium, molybdenum, tungsten and silicon; and a transition zone bond attaching said particles and matrix, said bond being composed of the carbide of said metal.

7. A high temperature resistant member comprising; a body composed of discrete graphite particles; a metal matrix surrounding and binding said particles into a solid mass, said matrix being formed of free uncombined metal selected from the group consisting of titanium, zirconium, hafnium, vanadium, tantalum, chromium, niobium, silicon, thorium, and uranium; and a transition zone bond attaching said particles and matrix and composed of a carbide of said metal having less than carbon saturation, said class being further characterized as having increased temperature resistance with increased carbon content whereby said member will automatically respond to increasingly high temperature to increase the carbon content of said bond and the temperature resistance of said body.

8. The process of producing a high temperature resistant product having a body composed of discrete graphite particles embedded in a matrix of free uncombined metal and attached thereto by a transition zone bond composed of the carbide of said metal, and which consist in individually and separately and simultaneously heating a porous graphite body and a carbon combining metal selected from the group consisting of titanium, zirconium, hafnium, vanadium, niobium, tantalum, chromium, molybdenum, tungsten and silicon to the molten point of said metal, maintaining the heated condition of said body and metal through the vapor flash phase of said metal to drive off vaporizable material therein, and then flowing that quantity of said molten metal over said heated body that will effect penetration into and substantially fill the interstices of said body.

9. The process of forming a high temperature resistant product which consists in first forming a carbide envelope around discrete graphite particles wherein said carbide is formed from a metal selected from the group consisting of titanium, zirconium, hafnium, vanadium, niobium, tantalum, chromium, molybdenum, tungsten and silicon, and then filling the voids between said envelopes with a metal having a melting point lower than said carbide and forming a bond therewith.

References Cited by the Examiner

UNITED STATES PATENTS

| | | | |
|---|---|---|---|
| 2,205,864 | 6/1940 | Schwarzkopf | 75—221 X |
| 2,254,549 | 9/1941 | Small | 75—200 X |
| 2,415,196 | 2/1947 | Steinberg et al. | 106—56 X |
| 2,614,947 | 10/1952 | Heyroth | 117—118 X |
| 2,828,225 | 3/1958 | Goetzel et al. | 117—160 X |
| 2,862,828 | 12/1958 | Glaser | 106—56 |
| 2,876,139 | 3/1959 | Flowers | 117—160 X |
| 2,899,338 | 8/1959 | Goetzel et al. | 117—160 X |
| 2,902,574 | 9/1959 | Gudmundsen et al. | 219—19 |
| 2,950,979 | 8/1960 | Zosel | 106—56 |
| 2,969,448 | 1/1961 | Alexander | 219—19 |
| 3,001,238 | 9/1961 | Goeddel et al. | 23—208 X |
| 3,007,805 | 11/1961 | Cline | 106—56 X |
| 3,079,273 | 2/1963 | Johnson | 106—44 X |

FOREIGN PATENTS 713,710   8/1954   Great Britain.

L. DEWAYNE RUTLEDGE, *Primary Examiner.*

JOSEPH REBOLD, LEON D. ROSDOL, CARL D. QUARFORTH, REUBEN EPSTEIN, *Examiners.*

J. A. POER, W. T. HOUGH, M. R. DINNIN, R. L. GRUDZIECKI, *Assistant Examiners.*